May 19, 1970     D. SCHMIDT     3,512,358
CLOSED-CYCLE $CO_2$ GAS TURBINE POWER PLANT
Filed Nov. 4, 1968     2 Sheets-Sheet 1

Inventor:
David Schmidt
BY Pennie, Edmonds,
Morton, Taylor and Adams
ATTORNEYS

May 19, 1970 D. SCHMIDT 3,512,358
CLOSED-CYCLE CO$_2$ GAS TURBINE POWER PLANT
Filed Nov. 4, 1968 2 Sheets-Sheet 2

Inventor:
David Schmidt
BY Pennie, Edmonds,
Morton, Taylor and Adams
ATTORNEYS

United States Patent Office 3,512,358
Patented May 19, 1970

3,512,358
CLOSED-CYCLE $CO_2$ GAS TURBINE
POWER PLANT
David Schmidt, Erlenbach, Zurich, Switzerland, assignor to Sulzer Brothers Limited, Winterthur, Switzerland, a Swiss company
Filed Nov. 4, 1968, Ser. No. 773,261
Claims priority, application Switzerland, Nov. 8, 1967, 15,611/67
Int. Cl. F01k 25/00, 3/18
U.S. Cl. 60—36                                 4 Claims

ABSTRACT OF THE DISCLOSURE

A closed-cycle $CO_2$ gas turbine power plant employing a nuclear reactor as heat source includes a reservoir connecting to the cycle at points of different pressure therein through lines having valves controlled in response to changes in shaft speed or load to permit flow of $CO_2$ to the reservoir on decline in load and/or rise in shaft speed and vice versa. Refrigeration means are provided in the reservoir for partial liquefaction of $CO_2$ therein, coolant flow through those means being varied as an inverse function of load and direct function of shaft speed. In another embodiment a single line connects the reservoir to the cycle, and heating means are provided in the liquid space of the reservoir. On increase in load, the heating means are activated, raising the pressure in the reservoir and sending $CO_2$ gas into the cycle.

---

The present invention pertains to closed cycle gas turbine power plants having $CO_2$ as a working substance and employing a nuclear reactor or other suitable source of heat, with at least one storage vessel or reservoir for $CO_2$ working substance being connected to the closed cycle flow path for the working substance in order to effect, in the face of fluctuations in load, control of pressure and hence of the amount of working substance present in the cycle.

It has already been proposed to convert the heat produced in a nuclear reactor into electric energy by means of a closed cycle gas turbine plant in which the reactor coolant medium, for example helium or $CO_2$, is employed as the working substance to drive the gas turbine. In one known plant of this type adjustment to the required output is achieved by connecting the closed cycle flow path of the working substance to a reservoir for the working substance. When the load falls in such a plant, gaseous working substance is withdrawn from the cycle and is stored in the reservoir. Conversely, when the load on the plant increases, additional working substance flows from the reservoir into the cycle. In this way it is possible to regulate the output of the plant, for example as a function of the speed of the turbine shaft.

It is an object of the present invention to provide a simple and effective output regulation for closed cycle $CO_2$ power plants of this type. According to the invention, the reservoir is equipped with coolant means by means of which $CO_2$ is liquefied when the load declines. This can be achieved by subjecting to a control from the output power regulator of the system the flow of coolant or refrigerant which passes through those cooling means in the reservoir.

It is an advantage of the invention that by reason of the liquefaction of part of the $CO_2$ stored in the reservoir, the dimensions of the reservoir can be substantially reduced.

According to one embodiment of the invention, the reservoir is connected via separate lines into the $CO_2$ flow cycle at points upstream and downstream of the compressor therein by means of lines which include control valves. According to another embodiment of the invention however, the reservoir is connected with the closed $CO_2$ flow cycle by means of a single line, the reservoir being then equipped with heating means in the liquid space thereof. It is also possible to control the proportion of working substance in the reservoir as between gaseous and liquid phases.

Brief description of the drawings

The invention will now be further described in terms of a number of presently-preferred non-limitative exemplary embodiments thereof and by reference to the accompanying drawings, in which.

Description of preferred embodiments

Figure 1:
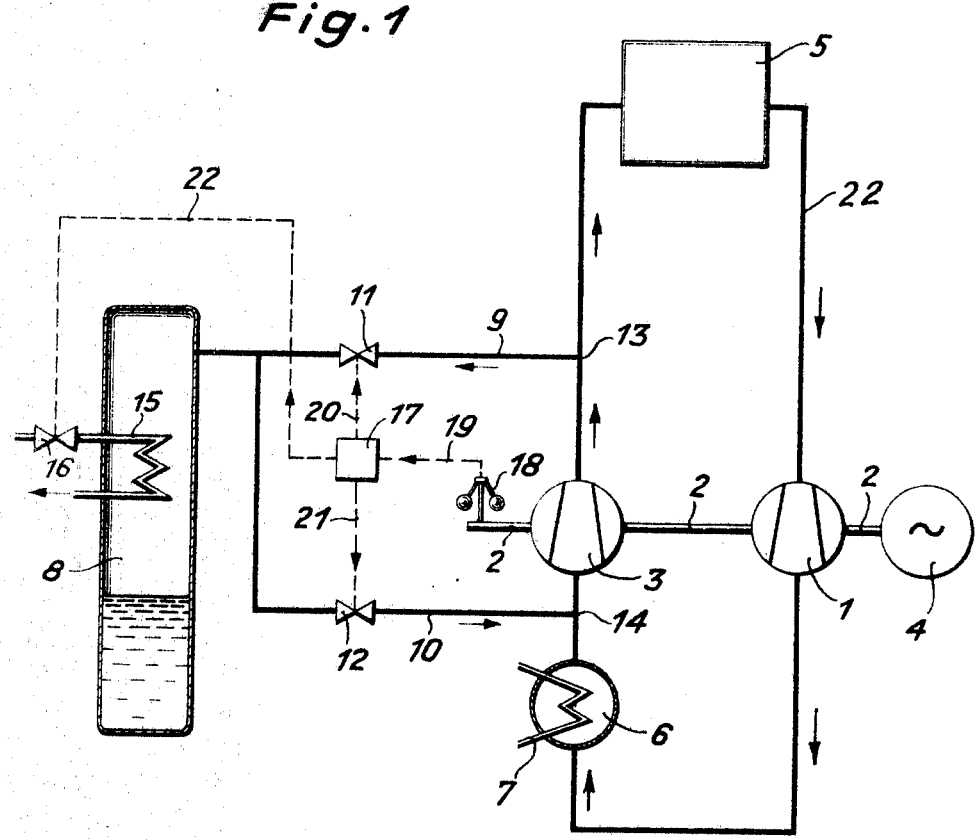
FIG. 1 is a diagrammatic representation of one power plant in accordance with the invention.

In the two figures of drawing, corresponding elements of structure are identified by the same reference characters. Heavy single lines are employed to indicate the flow path for the working substance while dashed lines indicate signal channels.

Figure 2:
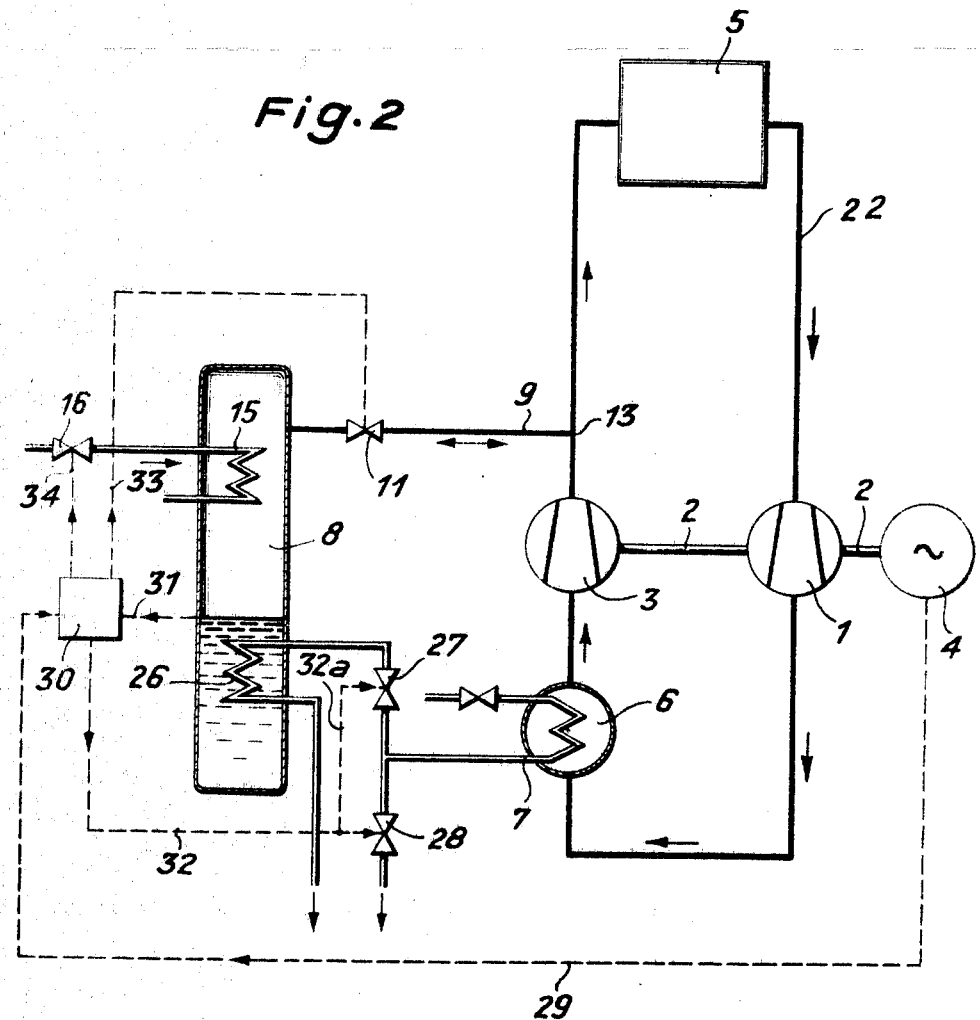
FIG. 2 is a diagrammatic representation of another power plant according to the invention.

In the single-shaft power plants shown in FIGS. 1 and 2, a gas turbine 1, a cooler 6, a compressor 3, and a nuclear reactor 5 are connected into a closed cycle as indicated at 22, through which the $CO_2$ working substance flows in the direction indicated by the arrows. By means of a shaft 2 the gas turbine 1 drives the compressor 3 and also an electric generator 4, which constitutes the useful output load of the plant. Heat is supplied to the working substance on its passage through the nuclear reactor 5 while the cooler 6 serves to remove heat from the working substance, the heat so removed being transferred to a coolant such as water flowing through the coil 7 in the cooler.

The plant is adjusted to deliver the required output power by means of a reservoir 8. In the embodiment of FIG. 1, the reservoir is connected into the closed cycle 22 by means of a line 9 connected into the cycle 22 at a point 13 of maximum pressure, downstream of the compressor 3. The reservoir is additionally connected into the cycle 22 by a line 10 at a point 14 of minimum pressure, upstream of the compressor 3. Lines 9 and 10 are equipped with valves 11 and 112 respectively, which may desirably be of the on-off type.

In accordance with the invention, working substance is stored in the reservoir 8 partly in liquid and partly in gaseous form. For liquefaction of working substance in the reservoir, the reservoir is provided with a cooling coil 15. A coolant such as brine or water flows through the coil 15 at a rate controlled by the setting of a valve 16.

In the embodiment of FIG. 1 the power output delivered from the plant is regulated by means of a regulator 17 in dependence on the speed of the shaft 2. More particularly, the regulation may be such as to maintain the shaft speed substantially constant. The speed of the shaft is measured by a tachometer 18 and a speed-representative signal is transmitted from the tachometer via a signal channel 19 to regulator 17. Regulator 17 controls valves 11 and 12 via signal channels 20 and 21. Another output signal is delivered from the regulator via signal channel 22 for control of valve 16 and hence of the flow of coolant through the coil 15.

In the event of a fall in the load carried by the plant, the resulting increase in shaft speed above the value set therefor at tachometer 18 will deliver to the regulator 17 a signal which causes the regulator to open valve 11 and simultaneously to increase the opening of valve 16, thereby increasing the coolant flow through coil 15. With valve 11 opened, the $CO_2$ working substance can flow out of the closed cycle 22, the pressure at the junction point 13 being greater than that existing in the reservoir 8. The increased coolant flow through the coil 15 just mentioned effects at least partial condensation of the $CO_2$ flowing into the reservoir. In consequence there occurs a rise in liquid level in the reservoir but without significant increase in pressure therein. As already stated, in view of the liquefaction of part of the $CO_2$ in the reservoir, the reservoir can be held to small dimensions.

Conversely, in the event of an increase in the load borne by the plant, incipient decline in shaft speed will open valve 12 while valve 11 will remain closed. Since in the event of such an increase in load the pressure in the reservoir 8 will be higher than that at the point 14, opening of valve 12 will result in a flow of working substance from the reservoir through line 10 into the cycle 22. This will continue until regulator 17 closes valve 12 in response to a signal from the tachometer 18. The pressure drop which would otherwise occur in the reservoir 8 in consequence of this loss of gas is compensated by partial evaporation of the liquid working substance therein.

In the embodiment of FIG. 2 the reservoir connects to the cycle 22 at one point only. Thus line 9 containing valve 11 connects to the cycle at the point 13 of maximum pressure immediately downstream of the compressor 3. The embodiment of FIG. 2 further differs from that of FIG. 1 in that a heating coil 26 is provided in the liquid space of the reservoir. This heating coil connects to the coolant coil 7 in the cooler 6 and is thereby supplied with water, heated upon its passage through the cooler 6. By means of valves 27 and 28 coupled together for adjustment in opposite senses, a greater or lesser proportion of the coolant water emerging from the coil 7 can be delivered for flow through the heating coil 26. In the plant of FIG. 2 the electric generator 4 includes a load indicator (not shown). This load indicator delivers a set value signal to a regulator 30. This set value signal is compared in the regulator 30 with an actual value signal representative of liquid level existing in the reservoir and delivered to the regulator 30 via signal channel 31.

In the event of an increase in load, the set value signal delivered from the generator 4 to the regulator 30 will fall. The resulting difference between the signals delivered to the regulator 30 via lines 29 and 31 causes the regulator 30 to deliver a signal via channel 32 and its branch 32a which adjusts valves 27 and 28 in the senses required to increase the flow of heating fluid through the coil 26. That is, the openings of valves 27 and 28 are increased and decreased respectively. Consequently, liquefied working substance will be evaporated in the reservoir, raising the pressure therein. A delayed output signal from the regulator 30 then opens valve 11 via channel 33, thus permitting gaseous working substance to flow from the reservoir into the cycle 22. A further output signal may be delivered from regulator 30 via signal channel 34 to reduce or cut off the flow of coolant through valve 16, and hence through the cooling coil 15.

The same operations take place in the event of a rise in liquid level occurring in the reservoir 8 due to some malfunction, even in the face of a constant value of set point input signal to the regulator 30 from the generator 4.

When the load falls or when the actual level of liquid falls in the reservoir 8, producing in either event a value of actual liquid level signal in channel 31 below that corresponding to the set point signal instantaneously supplied by the generator, there will be produced a partial condensation of the gaseous $CO_2$ in the reservoir in consequence of a reduction effected by the regulator 30 of flow of heating fluid through the coil 26. The pressure in the reservoir therefore falls so that upon delayed opening of valve 11, $CO_2$ gas flows from the cycle 22 through the line 9 and into the reservoir.

By way of numerical example of the pressures which may exist in plants of the invention, it may be mentioned that for an assumed temperature of 25° to 30° C. in the resrvoir 8, equilibrium of the liquid and gaseous phases will exist at a pressure of some 65 to 75 atmospheres in the reservoir. At full-load operation of the plant, the pressure at point 13 may then be some 150 to 200 atmospheres, whereas the minimum pressure in the plant at point 14 may be about from 20 to 30 atmospheres. With the plant operating under partial load, the maximum pressure in the cycle 22 may be from 100 to 150 atmospheres, whereas the minimum pressure therein and the pressure in the reservoir (which latter depends upon the temperature) may remain substantially unchanged.

Obviously the plant of the invention is not limited to these pressures and may operate in other pressure ranges, for example when the temperature in the reservoir is held at other values, for example by artificial means.

The invention is not limited to the embodiments illustrated. It can be applied to plants having two or more shafts with plural compression and expansion stages. It is moreover possible to embody the invention in plants in which the $CO_2$ is in partially liquefied condition in the closed flow cycle itself. Similarly the embodiments described are only exemplary of the control mechanisms, measured variables, and set point signals which can be employed.

More generally, the invention includes all modifications of and departures from the embodiments hereinabove described properly following within the spirit and scope of the appended claims.

I claim:

1. A closed-cycle $CO_2$ gas turbine power plant comprising a source of heat, a gas turbine, a cooler and a compressor connected into a closed cycle, a reservoir, a line connecting the reservoir to the cycle, means to cool the interior of the reservoir, and means to control the flow of coolant through said cooling means and the opening of said line in dependence on the load on the plant.

2. A gas turbine power plant according to claim 1 including a second line connecting the reservoir to a point of different pressure in the cycle, said lines including valves operated in opposite senses in response to fluctuations in load.

3. A gas turbine power plant according to claim 1 including heating means in the liquid space of the reservoir and means to adjust the flow of a heating medium through said heating means directly with changes in load on the plant.

4. A closed cycle gas turbine power plant according to claim 1 wherein said control means include an output power regulator.

References Cited

UNITED STATES PATENTS

| | | |
|---|---|---|
| 2,345,950 | 4/1944 | Salzmann. |
| 2,929,217 | 3/1960 | Collman. |
| 3,218,807 | 11/1965 | Berchtold et al. |
| 3,220,191 | 11/1965 | Berchtold. |
| 3,221,511 | 12/1965 | Garrett. |
| 3,252,286 | 5/1966 | Whitelaw. |

MARTIN P. SCHWADRON, Primary Examiner

R. R. BUNEVICH, Assistant Examiner

U.C. Cl. X.R.

60—59

PO-1050
(5/69)

UNITED STATES PATENT OFFICE
CERTIFICATE OF CORRECTION

Patent No. 3,512,358        Dated May 19, 1970

Inventor(s)  David Schmidt

It is certified that error appears in the above-identified patent and that said Letters Patent are hereby corrected as shown below:

Col. 1, line 69, cancel "via separate lines".

Col. 2, line 63, for "22" substitute --23--.

In Fig. 1 of the drawing, for numeral "22" substitute --23--.

SIGNED AND
SEALED
OCT 27 1970

(SEAL)
Attest:

Edward M. Fletcher, Jr.
Attesting Officer

WILLIAM E. SCHUYLER, JR.
Commissioner of Patents